US012676086B1

(12) United States Patent
Kemp

(10) Patent No.: US 12,676,086 B1
(45) Date of Patent: Jul. 7, 2026

(54) COLLECTIBLE CARD PROTECTOR

(71) Applicant: Vaulted Vinyl LLC, Waterloo, IA (US)

(72) Inventor: Shane A. Kemp, Washington, DC (US)

(73) Assignee: Vaulted Vinyl LLC, Waterloo, IA (US)

( * ) Notice: Subject to any disclaimer, the term of this patent is extended or adjusted under 35 U.S.C. 154(b) by 0 days.

(21) Appl. No.: 19/087,178

(22) Filed: Mar. 21, 2025

(51) Int. Cl.
*G09F 13/04* (2006.01)
*G09F 1/12* (2006.01)

(52) U.S. Cl.
CPC .................................... *G09F 1/12* (2013.01)

(58) Field of Classification Search
CPC .. G09F 1/12; G09F 13/04; A47G 1/06; A47G 1/12
USPC .................................................. 40/700, 790
See application file for complete search history.

(56) References Cited

U.S. PATENT DOCUMENTS 5,363,964 A * 11/1994 Hexter, Jr. ........... B65D 25/107 206/454
5,943,801 A * 8/1999 Wilkinson .............. G09F 13/14 40/716
D898,355 S 10/2020 Cox
D917,879 S 5/2021 Chui
D940,453 S 1/2022 Gill
D970,887 S 11/2022 Kalbach
D1,053,564 S 12/2024 Zhou
D1,075,922 S * 5/2025 Neugebauer ................. D21/392
2002/0139028 A1* 10/2002 Harlow ................ A47G 1/0616 40/728
2003/0226302 A1* 12/2003 Flodin .................... A47G 1/143 40/781
2005/0259407 A1* 11/2005 Ueno ........................ G09F 3/20 361/752
2011/0131855 A1* 6/2011 Heeps ................ G11B 33/0416 40/792
2012/0285060 A1* 11/2012 Gross ..................... A47G 1/065 40/711
2020/0407144 A1 12/2020 Kemp
2022/0254280 A1* 8/2022 Chiu ......................... G09F 3/18
2022/0415211 A1* 12/2022 Taylor ....................... G09F 1/12
2023/0048029 A1* 2/2023 Brinkerhoff ........... B65D 25/54
2023/0061550 A1* 3/2023 Newman ................... G09F 1/12
2023/0127622 A1* 4/2023 Williams ................ A47G 1/06 40/711
2023/0284760 A1 9/2023 Shooltz
2024/0285051 A1 8/2024 Kemp (Continued)

OTHER PUBLICATIONS

Cases Prior to Mar. 21, 2025, 3 pages.

(Continued)

*Primary Examiner* — Shin H Kim
(74) *Attorney, Agent, or Firm* — BLANK ROME LLP

(57) ABSTRACT

A collectible trading card protector has a base plate and a cover plate. The trading card is positioned between the base plate and the cover plate. The base plate has female locking recesses positioned to the sides of the base plate, and the cover plate has male locking member positioned to the sides of the cover plate. The male locking member is received in the female locking recess and slidably engages a ledge in the recess to releasably lock the cover plate to the base plate. The base plate and cover plate each include magnets that align with each other and further facilitate the cover plate moving into the final locked position and prevent the cover from inadvertently moving to an unlocked position.

14 Claims, 7 Drawing Sheets

(56) References Cited

U.S. PATENT DOCUMENTS

| | | | | |
|---|---|---|---|---|
| 2024/0321144 | A1* | 9/2024 | Huyke-Phillips | G09F 1/12 |
| 2024/0324743 | A1* | 10/2024 | Anderson | A45C 11/18 |
| 2024/0339050 | A1* | 10/2024 | Huyke-Phillips | G09F 1/12 |
| 2025/0131856 | A1* | 4/2025 | Pavlow | G09F 1/12 |

OTHER PUBLICATIONS

Vaulted Card Mag, posted Apr. 22, 2025 [online], [retrieved Dec. 23, 2025]. Retrieved from internet, https://web.archive.org/web/20250422003925/https://vaultedcollection.com/products/card-mag (Year: 2025).

PJU Store 120ct Magnetic Card Holder, posted May 17, 2024 [online], [retrieved Dec. 23, 2025]. Retrieved from internet, https://www.amazon.com/Magnetic-Trading-Protection-Baseball-Protectors/dp/B0D4D4L5YB/(Year. 2024).

* cited by examiner

COLLECTIBLE CARD PROTECTOR

BACKGROUND

A collectible is any item that has interest to a collector or is otherwise sought out by collectors. There are a wide range of collectibles, including freestanding collectibles and dependent (non-freestanding) collectibles. Freestanding collectibles can stand upright on their own without support. Figures or figurines are one type of freestanding collectible, such as Funko POPS!, and characters from movies, television, video games or pop culture. Often, figurine collectibles are similar in size to each other, but have very different shapes. However, the figurine collectible can be packaged in protective containers or boxes that have a standard shape. For example, figurine collectibles, and particularly Funko POPS!, are all different shapes but relatively the same size and can each be individually packaged in a box that has a rectangular cuboid shape and has a viewing window at at least a portion of the front of the box, such as shown in U.S. Pub. No. 2020/0407144. The figurine collectibles are configured to stand upright without support, and are elongated with a comparable length (x-direction), height (y-direction), and width or depth (z-direction). Likewise, the box packaging has a rectangular cuboid shape with a horizontally-extending (i.e., parallel to the bottom and top of the box, in the x-z plane) transverse cross section that is substantially square-shaped or slightly rectangular in shape, whereby the depth and width of the box provides sufficient support for the box to reliably stand upright on its own without support.

Trading card collectibles are a type of dependent (non-freestanding) collectible that has a growing community of collectors and can include, for example, sports cards (e.g., baseball), POKÉMON cards, and entertainment-related cards. For a given type of card (e.g., baseball vs. POKÉMON), those collectibles are standard in size (width, height) and shape. For instance, trading card collectibles are rectangular and formed of a thin, flat, flexible, bendable, sheet made of laminated card stock with printing on one or both sides.

Trading card collectibles are typically sold in smaller groups of single cards or 5-20 cards and packaged in a sealed wrapper, and are also sold in larger quantities of 50, 100 or 800 cards, and contained in a cardboard box. For example, baseball trading card collectibles are sold in packs of 4-16 cards, and also in boxes that hold 24, 30 or more packs per box, and a case can be used to hold multiple boxes. More valuable cards can be individually placed in a flexible bendable sleeve or a rigid case that are transparent so that the card can be viewed on one or both sides. As mentioned, individual trading cards are thin and flexible (small width, z-direction), and therefore unable to stand upright on their own.

Rigid plastic card collectible housings, namely a card protector case, have been developed to hold an individual trading card and prevent the card from being damaged during storage, transport or display, such as shown for example in U.S. Patent Application Publication No. 2024-0285051, which is incorporated herein by reference in its entirety.

One such card protector case 10 is shown in FIG. 8. The case 10 has a base plate 20 and a cover plate 30, each made of transparent rigid plastic. The base plate 20 has a central recess that receives a card, a base top end and a base bottom end. The base bottom end has an upright portion 22 with openings 24, and the base top end has a base magnet 26. The cover plate 30 has a cover top end, and a cover bottom end.

The cover bottom end has downward extending tabs 32, and the cover top end has a cover magnet 34. The tabs 32 are rotatably received in the openings 24 in the base plate 20, to form a hinge. In use, the user places a card in the central recess, then places the cover plate 30 over top of the base plate 20 and inserts the cover tabs 32 into the base openings 24. The user then rotates the cover top end toward the base top end, pivoting about the hinge, until the cover magnet 34 magnetically attracts the base magnet 26. The magnets 34, 26 hold the cover plate 20 on the base plate 30 at the top ends, and the cover tabs 32 and base openings 24 hold the cover plate 20 to the base plate 30 at the bottom ends.

However, conventional card protector cases aren't always reliable, and can inadvertently come apart, leaving the card vulnerable to damage. In addition, card protector cases can require exact alignment to attach the cover plate to the base plate, making them difficult to open and close while at the same time holding both plates.

SUMMARY

Thus, there is a need to have a card protector case that is easy to open and close. There is a further need to have a card protector case that is easy to open and close, but is also highly reliable to avoid inadvertent separation.

These and other objects of the disclosure, as well as many of the intended advantages thereof, will become more readily apparent when reference is made to the following description, taken in conjunction with the accompanying drawings. This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

DETAILED DESCRIPTION

Figure 1A:
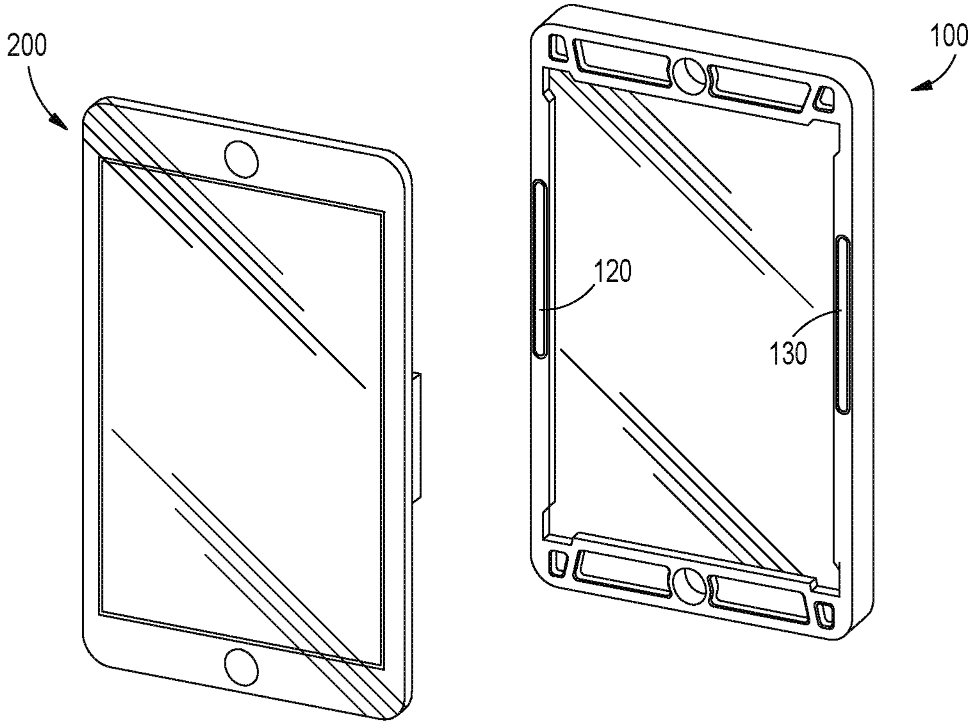
FIG. 1A is a perspective view of the collectible card protector in accordance with an embodiment of the disclosure, with the base separated from the cover, and showing the front surface of the base and the front surface of the cover.
Figure 1B:
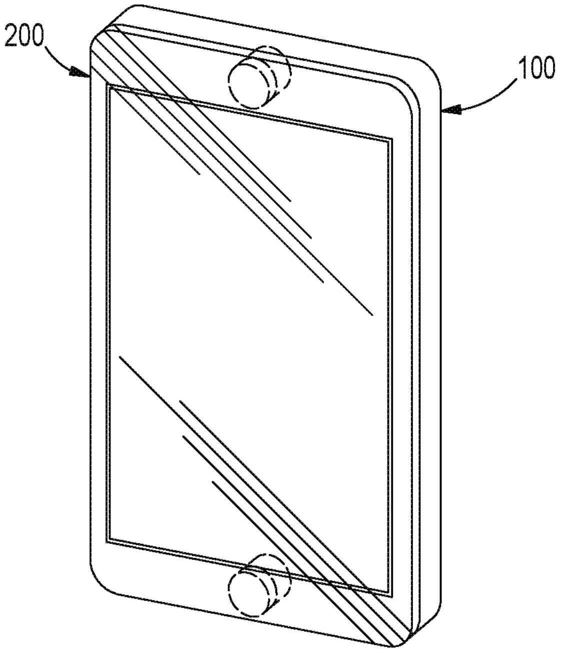
FIG. 1B is a perspective view of FIG. 1A with the base coupled to the cover.
Figure 2A:
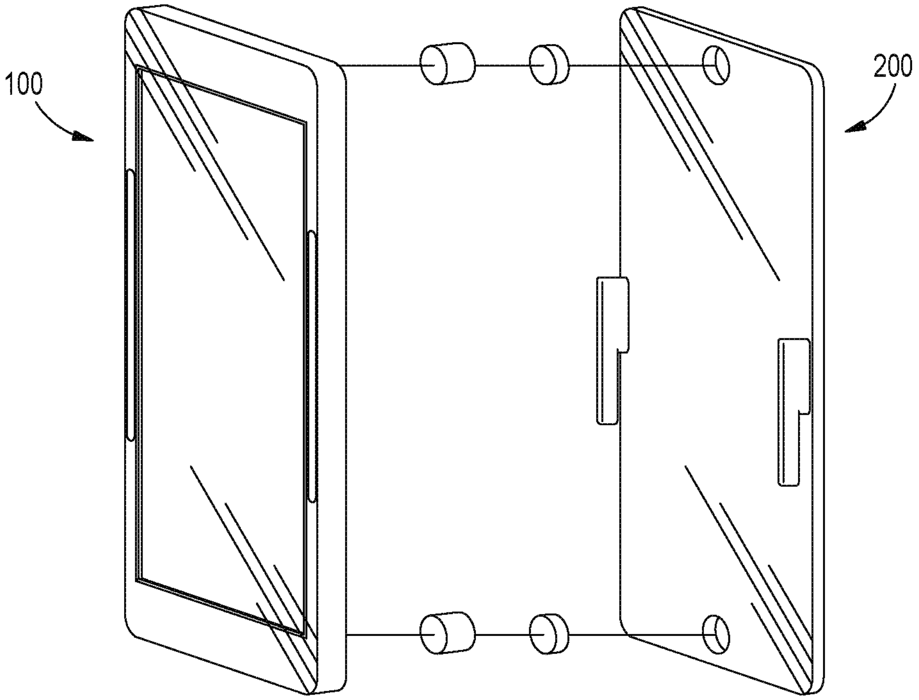
FIG. 2A is a perspective view of the base separated from the cover, and showing the rear surface of the base and the rear surface of the cover.
Figure 2B:
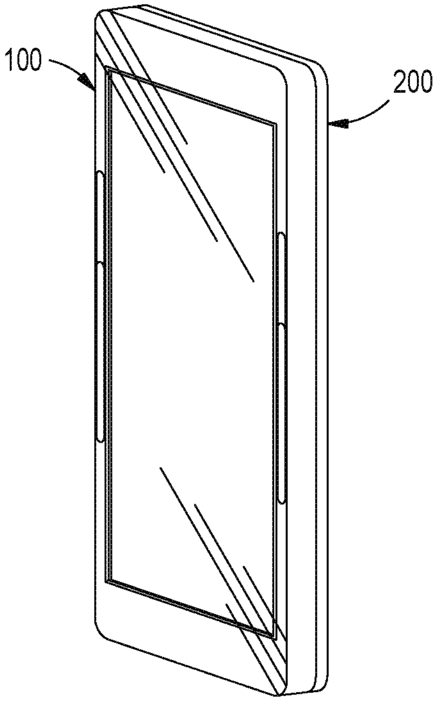
FIG. 2B is a perspective view of FIG. 2A with the base coupled to the cover.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Turning to the drawings, FIGS. 1-6 a card collectible protector case 50 in accordance with an illustrative, non-limiting embodiment of the present disclosure. Referring to FIGS. 1A, 1B, 2A, 2B, the protector case 50 has a base plate 100 (FIGS. 3A, 3B, 3C) and a cover plate 200 (FIGS. 4A, 4B, 4C) and forms a housing. The cover plate 200 is received over top of the base plate 100 and forms an internal space in the housing that receives a trading card collectible, such as a baseball card. The trading card collectible is rectangular and formed of a thin, flat, flexible, bendable, sheet made of laminated card stock with printing on one or both sides. The base plate 100 and cover plate 200 are flat, thin and transparent. The base plate 100 and cover plate 200 have a similar size and shape as the trading card collectible, namely rectangular and slightly larger than the trading card collectible.

Figure 3A:
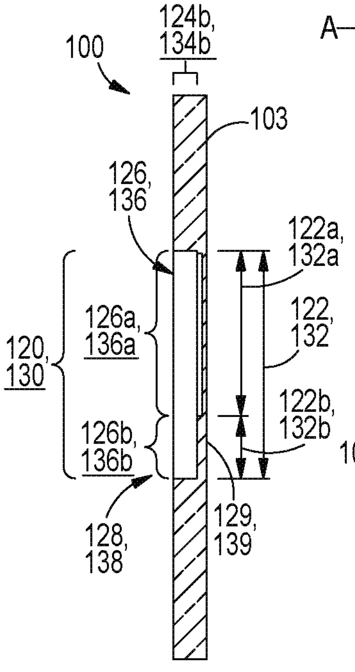
FIG. 3A is a left-side view taken along a cross-section A - - A of FIG. 3B of the base.
Figure 3B:
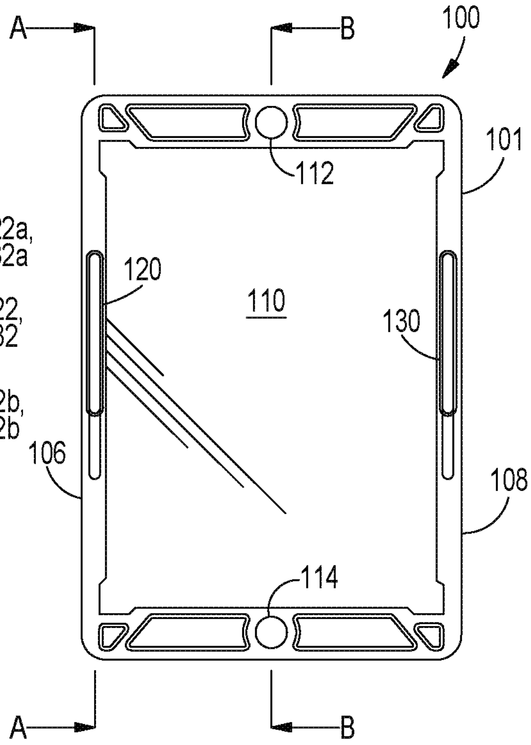
FIG. 3B is a front plan view of the base.
Figure 3C:
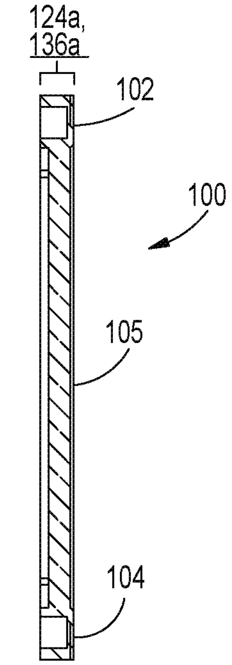
FIG. 3C is a right-side view taken along a cross-section B - - B of FIG. 3B of the base.

Base Plate 100 (FIGS. 3A, 3B, 3C)

FIGS. 3A, 3B, 3C show the base plate 100 in further detail. The base plate 100 has a base body 101 that includes a base top end portion 102, base flat planar front surface 103, base bottom end portion 104, base planar flat rear surface 105, base left-side end portion 106, and base right-side end portion 108. The base front surface 103 faces forward toward the user and toward the cover plate 200, and the base rear surface 105 faces rearward, opposite the base front surface 103 and parallel to the front surface 103. The base top end portion 102 has a base top edge, the base bottom end portion 104 has a base bottom edge, the base left-side end portion 106 has a base left-side edge, and the base right-side end portion 108 has a base right-side edge. The base top edge, base bottom edge, base left-side edge, and the base right-side edge form an outer perimeter of the base body 101.

A planar base center recess 110 is formed in the base front surface 103, between the base end portions 102, 104, 106, 108, and receives a trading card collectible. The base center recess 110 has the same shape (rectangular, namely flat, thin, elongated and planar) as the trading card collectible, and is parallel to the base front surface 103. The base center recess 110 is slightly larger in size (length, width, thickness) than the trade card collectible, so that the trading card collectible is snugly received in the base center recess 110. The top surface of the trading card collectible is recessed with respect to the base front surface 103, so there is a slight gap or spacing between the collectible card top surface and the rear surface 205 of the cover 200.

A first base coupling member, here shown as a first base opening and a first base magnet 112, is provided at a center of the base top end portion 102. The first base opening extends part-way into the base top end portion 102 from the base front surface 103, but does not extend completely through the base top end portion 102 to the base rear surface 105. The first base magnet 112 is positioned in the first base opening at the base front surface 103, and can be affixed in the first base opening, such as by an adhesive and/or friction fit.

A second base coupling member, here shown as a second base opening and a second base magnet 114, is provided at a center of the base bottom end portion 104. The second base opening extends part-way into the base bottom end portion 104 from the base front surface 103, but does not extend completely through the base bottom end portion 104 to the base rear surface 105. The second base magnet 114 is positioned in the second base opening at the base front surface 103, and can be affixed in the second base opening, such as by an adhesive and/or a friction fit.

A third base coupling member comprises a first side female locking member. For example, the first side female locking member is a first side locking channel 120 formed at the base left-side portion 106. And a fourth base coupling member comprises a second side female locking member. For example, the second side female locking member is a second side locking channel 130 formed at the base right-side portion 108. Each locking channel 120, 130 is formed as an elongated slit or slot that extends transversely through the width of the base body 101. Each of the channels 120, 130 is elongated with a channel length 122, 132 that extends in a longitudinal direction parallel to the longitudinal sides portions 106, 108, a channel width 124, 134 that extends transversely from the base front surface 103 to the base rear surface 105, and a channel thickness that is transverse to the base front and rear surfaces 103, 105.

The side locking channels 120, 130 each have a first left- and right-channel receiving section 126, 136, and a second left- and right-channel locking section 128, 138, respectively. The first channel receiving section 126, 136 has a first channel 126*a*, 136*a* with a first channel length 122*a*, 132*a* and a first channel width 124*a*, 134*a*; and the second channel 126*b*, 136*b* of the second channel receiving section 128, 138 has a second channel length 122*b*, 132*b* and a second channel width 124*b*, 134*b*. The first receiving channel 126*a*, 136*a* extends completely through the base body 101, from the front surface 103 to the rear surface 105.

The second channel locking section 128, 138 has a second locking channel 126*b*, 136*b* and a thin elongated locking ledge or lip 129, 139. The locking ledge 129, 139 is formed at the second channel locking section 128, 138 at the base front surface 103. The locking ledge 129, 130 has a ledge front surface that is flush with the base body front surface, and a ledge rear surface that faces the second channel 126*b*, 136*b* in the second channel locking section 128, 138, respectively. Accordingly, the second channel locking section 128, 138 only extends partly through the base body 101, from the base rear surface 105 to the locking ledge 130, and the second channel 126*b*, 136*b* extends beneath the locking ledge 129, 139 at the second locking section 128, 138.

In one embodiment, the side locking channels 120, 130 are each positioned at about the middle of the base longitudinal sides end portions 106, 108, respectively. The left-side locking channel 120 can be aligned with the right-side locking channel 130, as shown, or in other embodiments can be offset. The locking channels 120, 130 extend inwardly orthogonal to the base front surface 103.

Figure 4A:
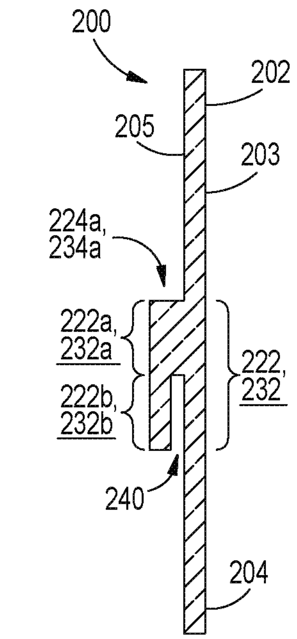
FIG. 4A is a left-side view taken along a cross-section C - - C of FIG. 4B of the cover.
Figure 4B:
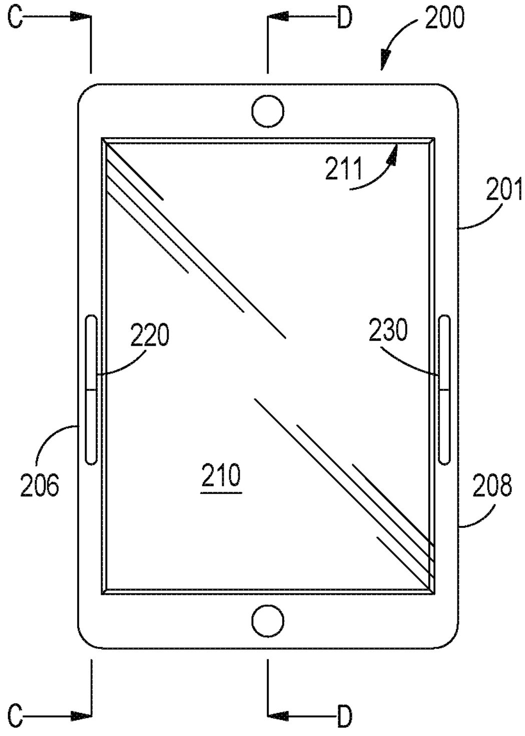
FIG. 4B is a rear plan view of the cover.
Figure 4C:
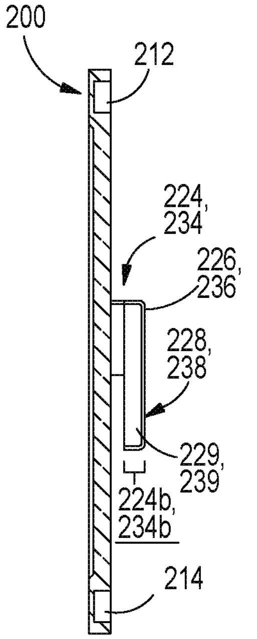
FIG. 4C is a right-side view taken along a cross-section D - - D of FIG. 4B of the cover.

Cover Plate 200 (FIGS. 4A, 4B, 4C)

FIGS. 4A, 4B, 4C show the cover plate 200 in further detail in accordance with a non-limiting illustrative embodiment. The cover plate 200 is configured to be slidably and removably engaged with the base plate 100. The cover plate 200 has a cover body 201 that includes a cover top end portion 202, planar cover flat front surface 203, cover bottom end portion 204, planar cover flat rear surface 205, cover left-side end portion 206, and cover right-side end portion 208. The cover front surface 203 faces forward toward the user and away from the base plate 100, and the cover rear surface 205 faces rearward toward the base plate 100, opposite the cover front surface 203 and parallel to the cover front surface. The cover top end portion 202 has a cover top edge, the cover bottom end portion 204 has a cover bottom edge, the cover left-side end portion 206 has a cover left-side edge, and the cover right-side end portion 208 has a cover right-side edge. The cover top edge, cover bottom edge, cover left-side edge, and the cover right-side edge form an outer perimeter of the cover body 201.

A first cover coupling member, here shown as a first cover opening and a first cover magnet 212, is formed at a center of the cover top end portion 202. The first cover opening extends part-way into the cover top end portion 202 from the cover rear surface 205, but does not extend completely through the cover top end portion 202 to the cover front surface 203. The first cover magnet 212 is positioned in the first cover opening at the cover rear surface 205, and can be affixed in the first cover opening, such as by an adhesive and/or friction fit.

A second cover coupling member, here shown as a second cover opening and second cover magnet 214, is formed at a center of the cover bottom end portion 204. The second cover opening extends part-way into the cover bottom end portion 204 from the cover rear surface 205, but does not extend completely through the cover bottom end portion 204 to the cover front surface 203. The second cover magnet 214 is positioned in the second cover opening at the cover rear surface 205, and can be affixed in the second cover opening, such as by an adhesive and/or a friction fit.

A third cover coupling member comprises a first side male locking member, and a fourth cover coupling member comprises a second side male locking member. For example, the first side male locking member 220 is formed at the cover left-side portion 206, and the second side male locking member 230 is formed at the cover right-side portion 208. Each of the first and second male locking members 220, 230 are formed as an elongated rail that projects outward from the cover rear surface 205 transverse to the width of the cover body 201 and orthogonal to the cover rear surface 205. The male locking members 220, 230 are elongated with a male locking member length 222, 232 that extends in a longitudinal direction parallel to the side edges of the longitudinal sides portions 206, 208, a male locking member width 224, 234 that extends transversely outward from the cover rear surface 205, and a male locking member thickness that is transverse to the cover front and rear surfaces 203, 205.

The side locking male members 220, 230 each have a first male locking section 226, 236, and a second male locking section 228, 238. The first male locking section 226, 236 has a first male locking section length 222*a*, 232*a* and a first male locking section width 224*a*, 234*a* (which is the same as the male locking member width 224, 234); and the second male locking section 228, 238 has a second male locking section length 222*b*, 232*b* and a second male locking section width 224*b*, 234*b*. The first male locking section 226, 236 is a thin support tab that extends orthogonally outward from the cover body rear surface 205. The support tab has a square or rectangular shape. The second channel locking section 228, 238 is a thin elongated locking rod or arm 229, 239 that extends outward and forward (toward the cover top end portion 202) from the support tab at the first male locking section 226, 236, and is integrally formed with the support tab. In the embodiment shown, the arm has a rectangular cross-section and a thickness that is slightly smaller than the channel width, so that the arm can be readily received in the base member channel 120, 130 and fits snugly in the channel so that the cover does not have much, if any, space to move side to side.

As shown, the locking arm 229, 239 extends parallel to the cover rear surface 205, and is separated from the cover rear surface 205 by a cover gap or locking slot 240. The cover locking slot 240 has a slot width (i.e., the distance from the inner surface of the ledge 229, 239 to the rear surface 205 of the body 201) that is slightly larger than the base locking ledge 129, 139. In addition, the cover locking slot 240 has a slot length that is the same as, or slightly longer than, the locking ledge length of the locking ledge 129, 139. Accordingly, in a locked position, the cover locking slot 240 fully receives the base locking ledge 129, 139.

A cover center recess 210 (see FIG. 7E) is formed in the cover front surface 203, between the cover end portions 202, 204, 206, 208. The cover center recess 210 has the same shape (rectangular, namely flat, thin, elongated and planar) as the trading card collectible, and is slightly larger in size (length, width, thickness) than the trade card collectible, so that the trading card collectible is visible through the cover center recess 210. Though the cover center recess 210 is on the cover front surface 203, it is visible through the cover rear surface 205, as shown in FIG. 4B. The cover center recess 210 forms a front cover recess lip 211 on the cover front surface 203 that the user can grip when placing the cover 200 on the base 100 and remove the cover 200 from the base 100. As illustrated, the lip 211 can form an obtuse angle with respect to the bottom of the recess 210, to be more ergonomic and easier to grip. In some embodiments, a similar base recess can be formed on the base rear surface 105 to further facilitate sliding the base 100 with respect to the cover 200.

Operation

Figure 5A:
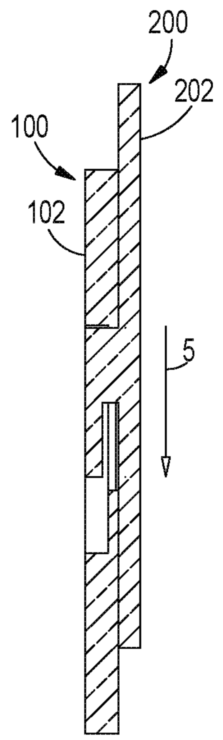
FIG. 5A is a left-side view taken along a cross-section E - - E of FIG. 5B of the protector in a pre-locking position.
Figure 5B:
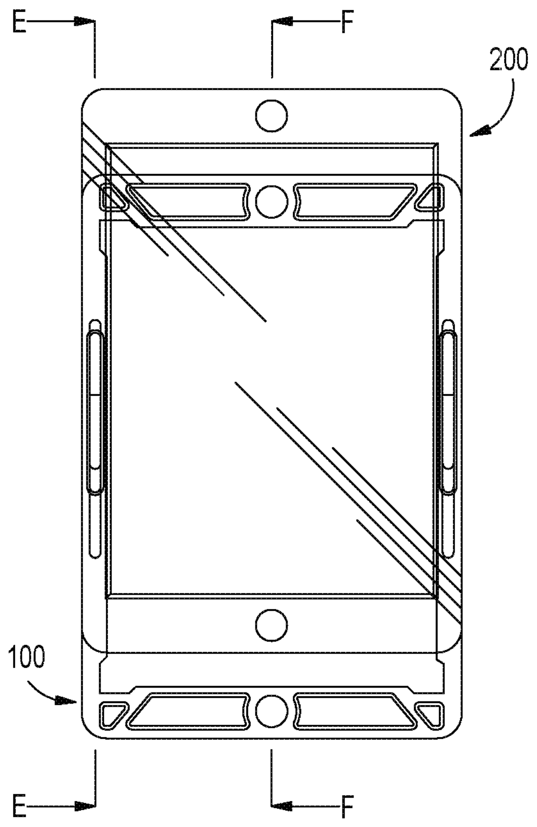
FIG. 5B is a front plan view of the protector in the pre-locking position.
Figure 5C:
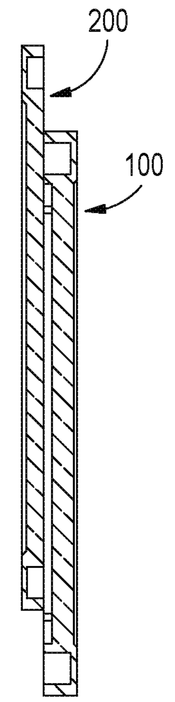
FIG. 5C is a right-side view taken along a cross-section F - - F of FIG. 5B of the protector in a pre-locking position.
Figure 6A:
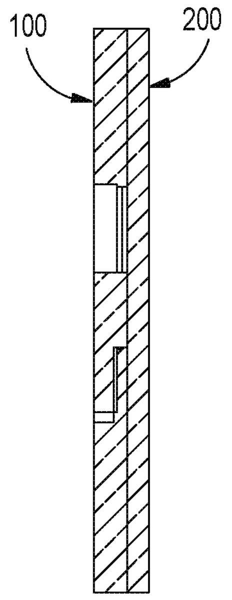
FIG. 6A is a left-side view taken along a cross-section G - - G of FIG. 6B of the protector in a locked position.
Figure 6B:
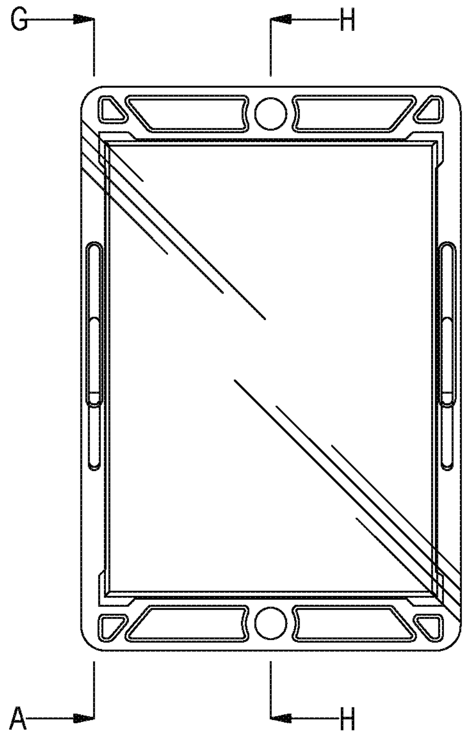
FIG. 6B is a front plan view of the protector in the locked position.
Figure 6C:
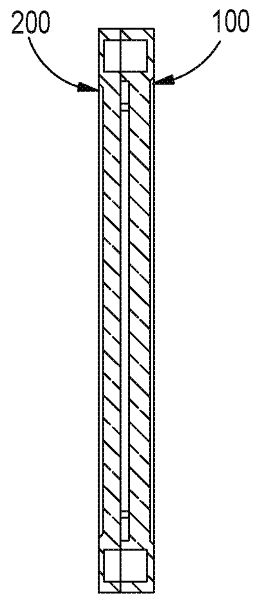
FIG. 6C is a right-side view taken along a cross-section H - - H of FIG. 6B of the protector in the locked position.

The protector case 50 has three positions, namely opened (FIGS. 1A, 2A), pre-locking (FIGS. 5A-5C), and closed or locked (FIGS. 6A-6C). In operation, the user starts with the case 50 in the opened position. In the opened position, the base plate 100 is separate and disengaged from the cover plate 200. The user can remove and replace or insert a trading card from or into the base center recess 110. The base center recess 110 snugly receives the trading card, so that the trading card does not move in the recess 110. In certain embodiments, the trading card can touch the recess top wall, recess bottom wall, and/or the recess side walls of the recess 110. The front surface of the trading card can be viewed through the transparent base front surface 103, and the rear surface of the trading card can be viewed through the transparent cover rear surface 205. It will be recognized, however, that the trading card can be placed either face up or face down in base recess 110. If face up, the user can view the front of the card through the cover 100 and the back of card through the base 200. If face down, the user can view the front of card through the base 200 and the back of the card through the cover 100.

The recess walls keep the trading card centered in the case 50, prevent the trading card from inadvertently falling out of the recess 110. The recess depth of the recess 110 is larger than the thickness of the trading card, so that the front surface of the trading card is recessed with respect to the base front surface 103. That allows the cover 200 to be placed on the base 100 without damaging or obstruction by the trading card.

FIGS. 5A-5C show the trading card protector in the pre-locking position. Here, the trading card is received in the recess 110 (or the recess 110 can be empty). The user aligns the planar cover rear surface 205 with the planar base front surface 103 so they are parallel to one another and the side edges are flush with one another. The user also aligns the respective first and second cover male locking members 220, 230 with the first and second base female locking members 120, 130. The user then inserts the cover male locking members 220, 230 into the base female locking members 120, 130.

Here, it is noted that the first channel section length 122*a*, 132*a* of the first channel 126*a*, 136*a* is slightly longer than the entire cover male locking member length 222, 232. Accordingly, the entirety of the cover male locking member 220, 230 (including the first section 226, 236 and the second section 228, 238) is received in the first base recess section 126, 136. The cover male locking member width 224, 234 is less than the width of the base plate 100, so that the male locking members 220, 230 do not protrude through the base rear surface 105. The male locking members 220, 230 can be flush with or recessed with respect to the base rear surface 105.

In this pre-locking position (FIGS. 5A-5C), the cover 200 is offset with respect to the base 100 in the longitudinal direction. Accordingly, the base top edge of the base top end portion 102 is offset with respect to the cover top edge of the cover top end portion 202; and in the embodiment shown, the cover top edge is lower than the base top edge, whereby the cover top edge extends over the recess 110. And, the base bottom edge of the base bottom end portion 104 is offset with respect to the cover bottom edge of the cover bottom end portion 204; and in the embodiment shown, the cover bottom edge is lower than the base bottom edge.

In addition, in the pre-locking position, the locking arm 229, 239 is aligned with the second locking channel 126*b*, 136*b* and the locking ledge 129, 139. The locking slot 240 has a width that is slightly larger than the width of the locking ledge 129, 139. And, the cover rear surface 105 can slide on and with respect to the base front surface 203. The rear wall of the first receiving section 126, 136 prevents the rear surface of the male locking member 220, 230 from moving in a downward direction (i.e., toward) the base bottom portion 104.

Once the card collectible protector case 50 is in the pre-locking position (FIGS. 5A-5C), the user can then move the case 50 to the locked position (FIGS. 6A-6C). To do so, the user presses the cover plate 200 downward in the direction 5 (FIG. 5A) with respect to the base plate 100, so that the cover top edge of the cover top end portion 202 moves downward until the cover top edge is aligned and flush with the base top edge of the base top edge portion 102. During this movement, the locking arm 229, 239 moves into the second channel 126*b*, 136*b*, and the top surface of the locking arm 229, 239 slides beneath the locking ledge 129, 139. It is further noted that as the case 50 moves from the pre-locking position to the locking position, the cover magnets 212, 214 are magnetically attracted to the base magnets 112, 114, which further facilitates movement of the cover 200 onto the base 100 and snaps the male locking member 220, 230 into the final locked position with the female locking members 120, 130, respectively.

Once the case 50 is in the fully locked position (FIGS. 6A-6C), the locking arm 229, 239 is fully received in the second channel 126, 136, and the locking ledge 129, 139 prevents the locking arm 229, 239 from moving transversely upward out of the channel 106, 108, which in turn prevents the base 100 from separately from the cover 200. In addition, the cover magnets 212, 214 cooperate with the base magnets 112, 114 to prevent the cover 200 from inadvertently separating by moving from the locked position to the pre-locking position. Accordingly, the cover 200 is releasably locked to the base 100. The case 50 forms a housing or enclosure that fully encloses the trading card within the interior space of the case 500 between the cover 200 and the base 100. And because the base recess 110 is recessed, the base front surface around the recess 110 comes into contact with the cover rear surface, thereby locking the trading card between the cover rear surface and the base recess 110 and base 100. The user can view the front surface of the trading card through the front surface of the cover 200, and the rear surface of the trading card through the rear surface of the base 100. And any impact to the case 50 will be shared by the cover 200 and base 100.

To separate the cover 200 from the base 100, the user operates in the opposite manner. The user pushes the cover 200 downward with respect to the base 100 until the rear surface of the male locking member 220, 230 hits the bottom wall of the female locking recess member 120, 130. The user can then lift the cover 200 orthogonally away from the base 100 until the cover 200 is free of the base 100.

Thus, when moving between the locked and unlocked positions, two directional movements are needed. The cover must be moved toward and away from the base in an orthogonal transverse direction. And, the cover must slide upward and downward from the base in a parallel direction movement, so that the cover 200 is slidably engaged with the base 100. By having those two directional movements, the cover is prevented from inadvertently separating from the base.

In one embodiment, the male locking members 220, 230 only fit into the female locking members 120, 130 if the base top 102 and the cover top 202 are both upright and align with each other. However, if the base 100 is inverted with respect to the cover 200 (so that the top 102, 202 of one aligns with the bottom 104, 204 of the other), the recesses 120, 130 will not align with the male locking members 220, 230. In other embodiments, in the inverted position, the recesses 120, 130 align with the male locking members 220, 230, and the base 100 is releasably locked to the base 200 by the magnets 112, 114, 212, 214, but the base 100 does not slide with respect to the cover 200 (since the top edge of the male member 220, 230 contacts the top of the ledge 129, 139) and the locking arm 229, 239 does not lockingly engage with the recess ledge 129, 139. In this position, the cover 200 is removed from the base 100 by prying the cover 200 outward against the force of the magnets.

Card Protector Sheet 300

Turning to FIGS. 7A-7E, a card collectible protector case 50*a* is shown having a card protector sheet 300 in accordance with another non-limiting illustrative embodiment of the present disclosure. Without intending to be limiting to any embodiment, the terms and components (e.g., parts, features, processes) used in the current embodiment are consistent with, and have the same purpose, function, and advantages as, those described in the earlier embodiment of FIGS. 1-6. These benefits include, but are not limited to, improved ease of use, safety, collectible protection, enhanced durability, increased reliability, and optimized performance. To avoid unnecessary repetition, these terms and components are not repeated herein. Any reference to specific terms or components should be understood to have the same meaning, purpose, function, and advantage as previously shown and described. Differences are described here, but there may be other variations that are not explicitly detailed.

The card collectible protector case 50*a* is the same as the card collectible protector case 50 of FIGS. 1-6, except that a card protector sheet 300 is provided. The card protector sheet 300 is a thin, elongated, planar transparent flat sheet that overlies the collectible (here, a card) to protect the collectible from being damaged as the cover 200*a* is slid ON/OFF of the base 100A.

In some embodiments, the base center recess 110 (FIG. 3B) is made sufficiently deep to accommodate both the collectible card, and the protective sheet 300, and provide a space or gap between the top surface of the sheet 300 and the cover rear surface 205*a*. The walls about the perimeter of the base center recess 110 prevent the collectible card and protective sheet 300 from moving around within the recess.

In operation, the collectible card is placed in the base center recess 110, and then the protector sheet 300 is placed over the top surface of the collectible card. The sheet 300 is especially useful to protect trading cards that are bowed or bent (inwardly or outwardly, at the center or edges) or otherwise have a non-planar feature, by pressing the trading card to be flat and planar within the base recess 110. The protector sheet 300 can be slightly larger than the collectible card to completely protect the collectible card. The cover 200 can then be aligned with and slidably engage the base 100, and the protector sheet 300 protects the collectible card to prevent any surface of the cover 200 from contacting or otherwise damaging the collectible card, without the protector sheet 300 itself damaging the collectible trading card. The protector sheet 300 also protects the collectible card from dust, dirt, water or other harm.

Figure 7A:
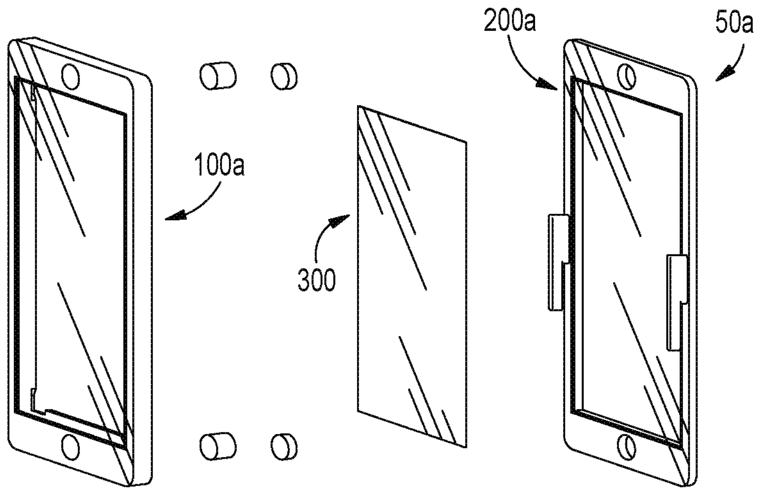
FIG. 7A is an exploded perspective view of the case in accordance with another illustrative non-limiting embodiment.
Figure 7B:
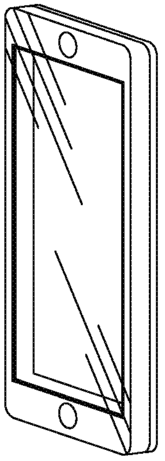
FIG. 7B is a perspective view of the case of FIG. 7A in a closed configuration.
Figure 7C:
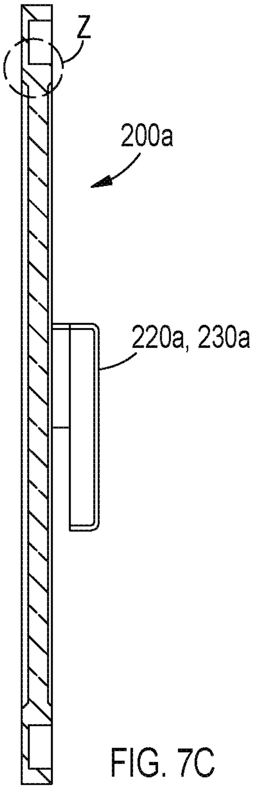
FIG. 7C is a side view of the case cover having a cover card rear recess.
Figure 7D:
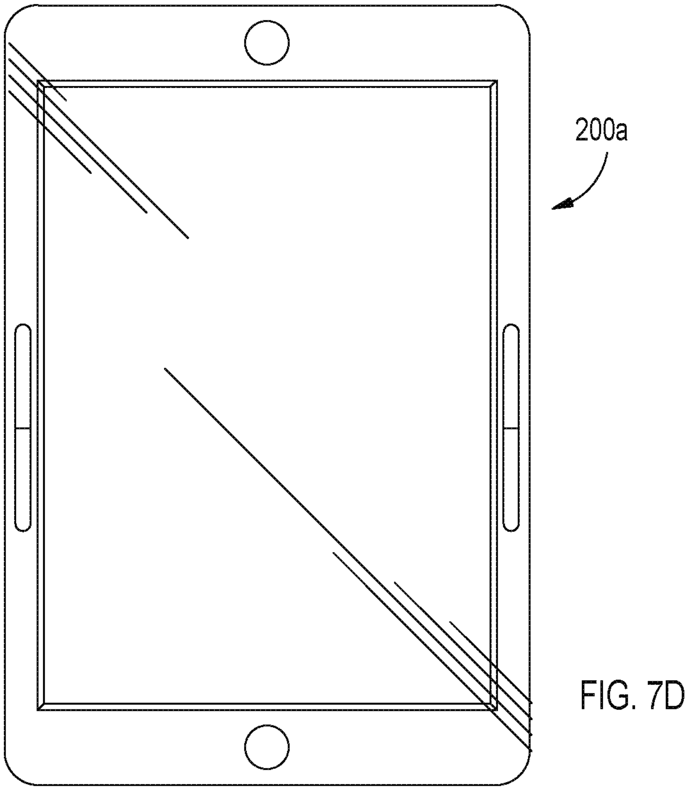
FIG. 7D is a rear plan view of the cover of FIGS. 7A-7C.
Figure 7E:
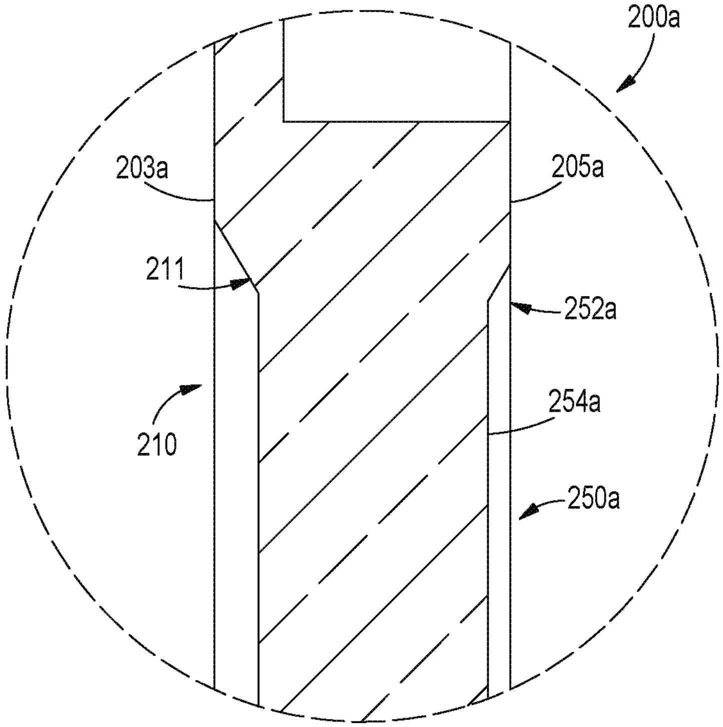
FIG. 7E is an enlarged view of section Z of FIG. 7C.
Figure 8:
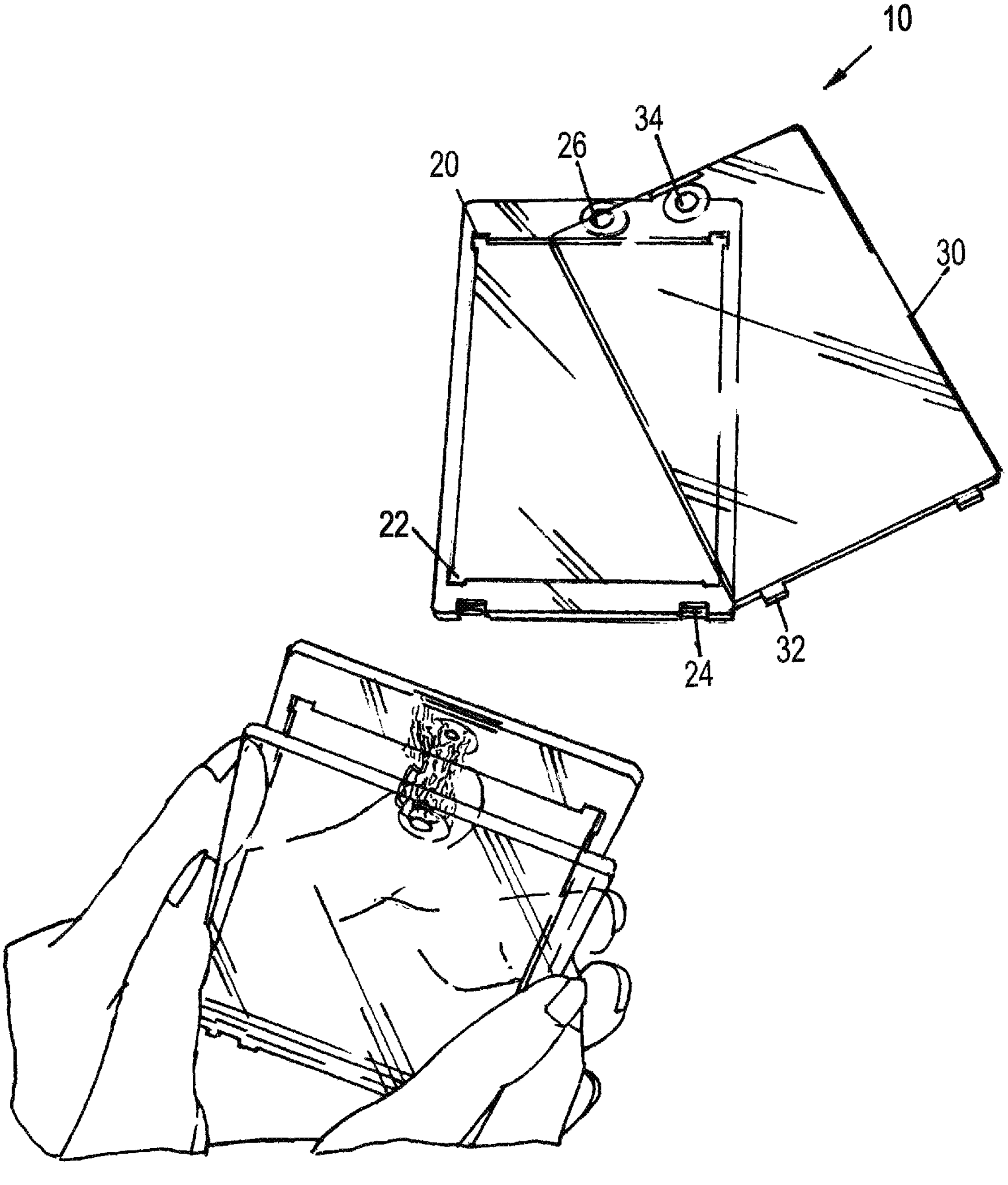
FIG. 8 PRIOR ART
FIG. 8 is a prior case.

In another embodiment as shown in FIGS. 7C-7E, a planar sheet recess 250 is formed in the planar cover rear surface 205*a*, between the cover end portions 202, 204, 206, 208, and receives the protector sheet 300. The cover center recess 250*a* has the same shape (rectangular, namely flat, thin, elongated, and planar) as the protector sheet 300, and is parallel to the cover rear surface 205*a*. The base center recess 250*a* is slightly larger in size (length, width, thickness) than the protector 300, so that the protector 300 is snugly received in the cover center recess 250*a*, with the sheet top surface facing and in contact with the bottom of the cover recess 250*a*. In some embodiments, the bottom surface of the protector sheet 300 is substantially flush with the cover rear surface 205*a*, though the protector sheet 300 can be the same or different width as the recess 250*a*, either larger or smaller. Thus, the protector sheet 300 can enter cover recess 250*a* over the trading card to protect the card when the cover 200*a* slidably engages the base 100*a*. In some embodiments, as the cover 200*a* slidably engages the base 100*a*, the protector sheet 300 can enter into the cover recess 250*a*. In still other embodiments, the cover recess 250*a* can be slightly smaller than the protector sheet 300, so that the cover rear surface 205*a* prevents the protector sheet 300 from entering into the recess 250*a* to create a gap or spacing between the protector sheet 300 and the bottom surface 254*a* of the cover recess 250*a*. There can also be a gap or spacing between the cover rear surface 205*a* and the protector sheet 300, and in other embodiments the cover rear surface 205*a* can press the protector sheet 300 against the collectible card to keep the card flat.

In the embodiments of FIGS. 1-7, removal features can be formed in the base 100 to facilitate removal of the protector cover 300 and the collectible card from the base recess 110. For example, the base center recess 110 can have a side lip that is angled. Or, a removal cutout can be formed at one side of the base center recess 110 and/or at the recess bottom surface, so that the user can readily insert a finger into the removal cutout to get under the collectible card and sheet 300.

CONCLUSION

It is further noted that the drawings may illustrate and the description and claims may use several geometric or relational terms and directional or positioning terms, such as base, cover, end, portion, edge, perimeter, between, planar, elongated, circular, rounded, parallel, perpendicular, orthogonal, transverse, rectangular, flat, top, bottom, left, right, up, down, and side. Those terms are merely for convenience to facilitate the description based on the embodiments shown in the figures, and are not intended to limit the disclosure. Thus, it should be recognized that the disclosure can be described in other ways without those geometric, relational, directional or positioning terms. In addition, the geometric or relational terms may not be exact. For instance, walls or surfaces may not be exactly flat, perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the disclosure.

In addition, while two cover magnets and two base magnets are shown, more or fewer magnets can be utilized, and the magnets can be located in other positions such as at one or more of the corners. And, while magnets are used for the coupling members 112, 114, 212, 214, other releasable coupling members can be used, such as clips, fasteners, slides, ramps, ledges or the like. And while female recesses and male tabs and arms are shown and used for the coupling members that are base locking members and cover locking members, other suitable locking members can be provided such as clips, fasteners, slides, ramps, ledges, or the like. Moreover, even though the recesses are shown on the base and the male locking members are shown on the cover, the recesses can be provided on the cover and the male locking members can be on the base. And, while two cover locking members and two base locking members are utilized, more or fewer cover and base locking members can be provided. Thus, other suitable coupling members and/or locking members can be provided, within the spirit and scope of the present disclosure.

Within this specification, the various sizes, shapes and dimensions are approximate and exemplary to illustrate the scope of the disclosure and are not limiting. The sizes and the terms "substantially" and "about" mean plus or minus 15-20%, or in other embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the disclosure and are not limiting. Thus, other dimensions, sizes and/or shapes can be utilized without departing from the spirit and scope of the disclosure.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A protector case, comprising:

a base plate having a base front surface, a base rear surface, a base top end portion, a base bottom end portion, a base left-side portion and a base right-side portion;

a base center recess formed at a center of said base front surface;

a first base coupling member formed at the base left-side end portion of the base plate;

a second base coupling member formed at the base right-side end portion of the base plate;

a first base magnet positioned at the base top end portion;

a second base magnet positioned at the base bottom end portion;

a cover plate having a cover front surface, a cover rear surface, a cover top end portion, a cover bottom end portion, a cover left-side portion and a cover right-side portion;

a first cover coupling member formed at the cover left-side end portion of the cover plate;

a second cover coupling member formed at the cover right-side end portion of the cover plate;

a first cover magnet positioned at the cover top end portion; and a second cover magnet positioned at the cover bottom end portion;

wherein said case has an unlocked position where said base plate is separate from said cover plate, and a locked position where said first and second base coupling members are releasably locked to said first and second cover coupling members, and said first and second base magnets are magnetically engaged with said first and second cover magnets.

2. The case of claim 1, further comprising a protector sheet positioned in said base center recess.

3. The case of claim 2, wherein said base center recess is configured to receive a standard sized trading card.

4. The case of claim 3, wherein the standard sized trading card is a baseball card.

5. The case of claim 1, wherein:

said first cover coupling member comprising a first male cover coupling member;

said second cover coupling member comprising a second male cover coupling member;

said first base coupling member comprises a first female base recess aligned with and receiving said first male cover coupling member in a first direction and slidably locking with said first male cover coupling member in a second direction orthogonal to the first direction; and said second base coupling member comprises a second female base recess aligned with and receiving said second male cover coupling member in the first direction and slidably locking with said second male cover coupling member in the second direction orthogonal to the first direction.

6. The case of claim 5, wherein:

said first male cover coupling member comprises a first tab that extends outward from said cover rear surface, and a first locking arm extending forward from said first tab parallel to said cover rear surface with an elongated locking slot therebetween;

said second male cover coupling member comprises a second tab that extends outward from said cover rear surface, and a second locking arm extending forward from said second tab parallel to said cover rear surface with an elongated locking slot therebetween;

said first female base recess comprises a first recess ledge that extends into said first female base recess and slidably engages said first locking arm in a locked position and prevents said cover plate from separating from said base plate in a transverse direction; and said second female base recess comprises a second recess ledge that extends into said first female base recess and slidably engages said second locking arm in the locked position and prevents said cover plate from separating from said base plate in the transverse direction.

7. A protector case for a collectible, comprising:

a base plate having a planar base front surface;

a planar base center recess formed in said planar base front surface;

a protector sheet removably received in said base center recess;

a base coupling member coupled to said base plate;

a cover plate; and a cover coupling member coupled to said cover plate for releasably engaging said base coupling member to releasable couple said cover plate and said base plate, wherein:

said base plate has a base plate planar back side and a base plate planar front side, said base plate front side having the planar base front surface;

said base coupling member accessible at the base plate front side;

said cover plate forming a planar front cover plate, and having a cover plate back side and a cover plate front side; and said cover coupling member accessible at the cover plate rear side, said cover coupling member configured to releasably engage said base coupling member at the base plate front side.

8. The case of claim 7, wherein said cover coupling member is slidably engaged with said base coupling member.

9. The case of claim 7, wherein the collectible is a trading card, said base center recess is elongated and planar to receive the trading card, and said protector sheet is configured to cover the trading card received in said base center recess.

10. A protector case for a collectible, comprising:

a base plate having a planar base front surface;

a planar base center recess formed in said planar base front surface;
a protector sheet removably received in said base center recess;
a base coupling member coupled to said base plate;
a cover plate; and
a cover coupling member coupled to said cover plate for releasably engaging said base coupling member to releasable couple said cover plate and said base plate,
wherein said base center recess has a recess bottom surface that is recessed with respect to the planar base front surface, and said protector sheet is removably received between the recess bottom surface and said cover plate.

11. A protector case for a collectible, comprising:
a base plate having a planar base front surface;
a planar base center recess formed in said planar base front surface;
a protector sheet removably received in said base center recess;
a base coupling member coupled to said base plate;
a cover plate; and
a cover coupling member coupled to said cover plate for releasably engaging said base coupling member to releasable couple said cover plate and said base plate,
wherein said base coupling member is formed in or on the planar base front surface, and said cover coupling member is formed in or on a cover plate rear surface.

12. The protector case of claim 1, wherein:
said base plate has a base plate planar back side and a base plate planar front side, said base plate front side having the base front surface;
said first and second base coupling members accessible at the base plate front side;
said cover plate forming a planar front cover plate, and having a cover plate back side and a cover plate front side; and
said first and second cover coupling members accessible at the cover plate rear side, said first and second cover coupling members configured to releasably engage said first and second base coupling members at the base plate front side.

13. The case of claim 1, wherein said base center recess has a recess bottom surface that is recessed with respect to the planar base front surface.

14. The case of claim 1, wherein said first and second base coupling members are formed in or on the base front surface, and said first and second cover coupling members are formed in or on a cover plate rear surface.

* * * * *